(No Model.)

T. DUNCAN.
MULTIPHASE METER.

No. 500,868. Patented July 4, 1893.

WITNESSES:
Frank S. Ober
Jos. J. Uhl

INVENTOR
Thomas Duncan
BY
M. A. Rosenbaum
ATTORNEY

UNITED STATES PATENT OFFICE.

THOMAS DUNCAN, OF FORT WAYNE, INDIANA.

MULTIPHASE METER.

SPECIFICATION forming part of Letters Patent No. 500,868, dated July 4, 1893.

Application filed September 3, 1892. Serial No. 444,962. (No model.)

*To all whom it may concern:*

Be it known that I, THOMAS DUNCAN, a citizen of the United States, residing at Fort Wayne, in the county of Allen and State of Indiana, have invented certain new and useful Improvements in Multiphase Meters, of which the following is a full, clear, and exact description.

This invention relates to electric meters, and has special reference to recording meters for measuring multi-phase alternating, pulsating or intermittent currents.

The object of the invention is to provide a cheap, efficient and reliable meter for measuring currents of the character described without the use of commutators, sliding or mercury contacts or other current rectifying or changing devices.

In another application filed by me December 21, 1891, Serial No. 415,825, I have described an electric meter for alternating currents based upon the principle that the repulsion of a closed secondary from its primary, when alternating or intermitting currents flow in the latter, may be utilized to measure the energizing current.

The invention herein described for measuring multi-phase currents operates partly on the same principle.

The details of the invention will now be described with reference to the accompanying drawings, in which—

Figure 1:
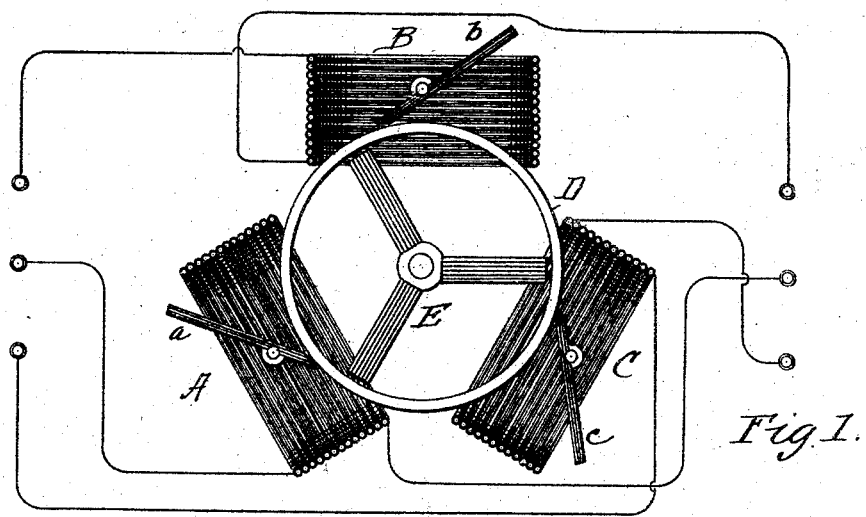
Figure 2:
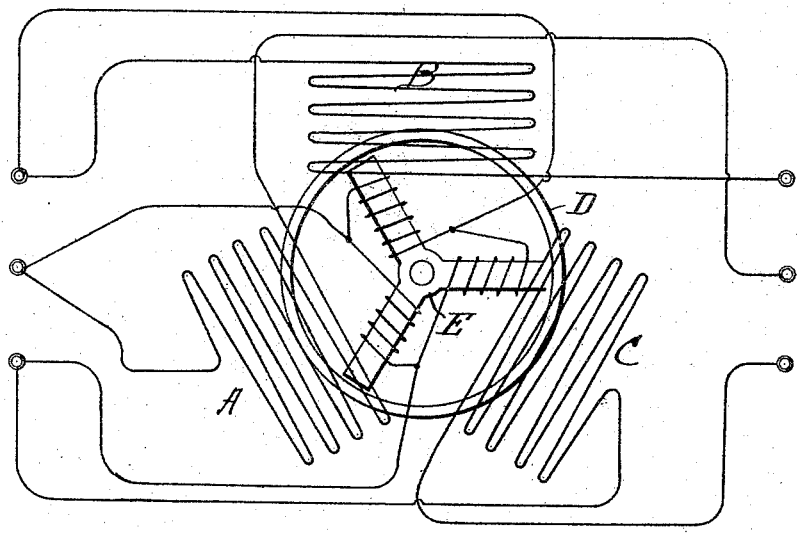
Figure 3:
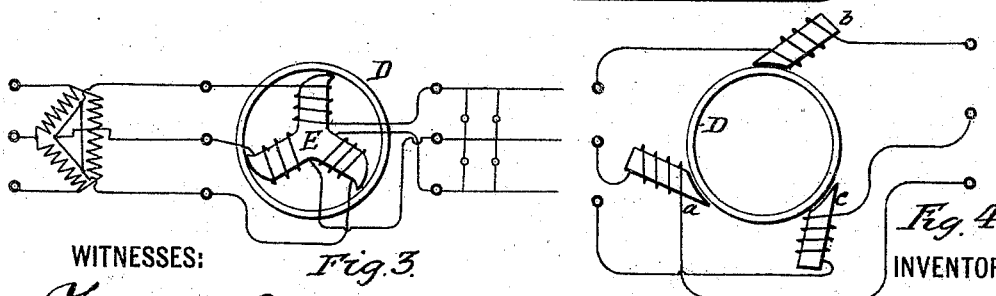
Figure 4:
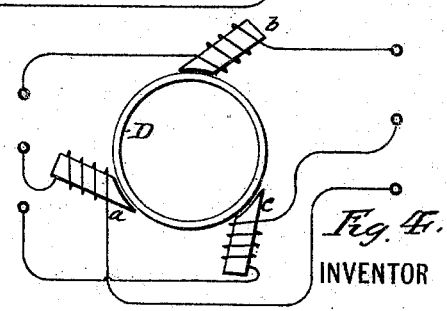

Figure 1 represents diagrammatically a simple form of coulomb meter for tri-phase currents. Fig. 2, represents in a similar manner a Watt meter for tri-phase currents, and Figs. 3 and 4 represent modifications of the invention.

Referring to the drawings by letter, A, B, C, represent three coils respectively located in the three conductors of a tri-phase current system of distribution, in which the current waves or changes in each conductor vary from the changes in the other conductors by one-third of a period, and these changes follow each other successively in the three circuits, so that the changes in the three coils A, B, C, would take place successively.

D represents a cylinder of copper, silver, iron or other good electric conducting material; this cylinder is supposed to be mounted on a shaft coincident with its axis, which connects with a train of wheels, communicating motion to a suitable counting mechanism, not shown. The three coils A, B, C, are located one hundred and twenty degrees apart around the cylinder, the axes of the coils being radial thereto. The coils are hollow and inclose a portion of the cylinder, but the adjacent coils do not overlap each other. They may, in consequence, all be made of the same size and removable from their operative position for the purpose of inspection or repair. Inside of the coils are placed iron cores, $a$, $b$, $c$, which are in the form of plates of laminated material. The inner edges of these plates are parallel to the surface of the cylinder, and they are adjustable upon a pivot at any desirable angle to the radius of the cylinder or axis of the coil. Inside of the cylinder there is mounted a frame E, consisting of three arms radiating from the axis of the cylinder, and approaching close to the inner surface of the same. This device normally stands stationary, but is adjustable upon its axis, so that its arms may be set at any desired position with relation to the coils or to the cores thereof.

The apparatus so far described is that ordinarily used for a coulomb meter as illustrated in Fig. 1. For a Watt meter, shunt coils illustrated in Fig. 2, are wound upon the respective arms of the frame E.

In describing the operation, the cylinder will be referred to as the armature and the frame E as the diverter. An impulse or current of electricity passing through the coils establishes a field of force which is conducted by the cores $a$, $b$, $c$, to the armature, which it cuts, and then passes through the adjacent arm of the diverter. The continuous changing of the alternating current, causes rapid changes in this magnetic field which induce Foucault currents in the armature of such a polarity, that a repulsive force will be set up between the armature and the coils. If this repulsive force takes place on lines parallel to the axes of the coils there will be no movement of the parts, but if the force is acting at an angle to the axis of the coils, approaching a tangent to this cylinder, the cylinder is caused to rotate on its axis, the torque being proportional to the angle at which the force is applied. Now as the impulses of current in the conductors of a tri-phase system follow each other successively, there will be a succession of forces acting at an angle upon the armature D, all of which will combine in causing the rotation and the resultant will be registered by the counting mechanism to which the cylinder is connected. In addition to the repulsive force acting upon the armature, just described, there is also a second force at work, upon the armature in the same direction. This is the force exerted by the so-called "rotary fields," the impulses acting successively around the cylinder establish a tendency to drag the cylinder after them. This force, added to the repulsive force described, drives the armature which records in proportion to the sum of the forces.

This form of meter may be used for ordinary alternating currents when the coils are connected in series, but in that case the iron cores and the diverter or one of them must be used to establish the repulsive force which would then be the only force at work.

In Fig. 3, the coils are wound upon the arms of the diverter and the extremities of the latter are shaped so that the magnetic flux will be at an angle to the radii of the cylinder. This figure also shows a tri-phase transformer for altering the voltage of the circuit containing the meter and the translating devices. It is to be understood that a transformer may be used anywhere in connection with my meter to alter the voltage to suit it. In Fig. 4 the diverter is eliminated and the coils with their cores are alone used. These two modifications are not the most efficient forms of my meter. They are simply illustrated to show the simplest forms in which it is possible to embody my invention. It is furthermore to be observed that, although I have described the meter in connection with the tri-phase currents, it is applicable in exactly the same manner to four-phase currents, or any multi-phase currents. The direction of rotation of the meter may be altered by swinging the diverter and the cores, if both are used, across the axial line of the coils. The adjustable cores inside the coils may be regarded as diverters, also.

This apparatus would make a good motor if the cores were connected by an iron ring and it is to be understood that my claims herein are designed to cover a motive apparatus, which may be used either as a meter or motor.

Having described my invention, I claim—

1. In an electric meter or motive device, a plurality of coils in combination with a rotating closed circuit or secondary arranged in inductive relation to said coils and a magnetic diverter determining the angle of the lines of force induced by the coils, to the rotating secondary, substantially as described.

2. An electric meter or motive device, for multi-phase currents consisting of three or more coils located respectively in the three or more circuits of the system, in combination with a rotating closed circuit or secondary arranged in inductive relation to said coils and a magnetic diverter, determining the angle of the lines of force induced by the coils, to the rotating secondary, for the purpose set forth.

3. An electric meter or motive device for multi-phase currents consisting of three or more coils located respectively in the three or more circuits of the system, in combination with a rotating closed circuit or secondary arranged in inductive relation to said coils and an adjustable magnetic diverter, determining the angle of the lines of force induced by the coils, to the rotating secondary, for the purpose set forth.

4. An electric meter or motive device for multi-phase currents consisting of three or more open or solenoid coils located respectively in the three or more circuits of the system, in combination with a rotating closed circuit or secondary in the form of a cylinder, the coils being arranged around the cylinder with their axes substantially radial thereto, and inclosing the edges thereof without overlapping each other and a magnetic diverter mounted concentrically with the cylinder and adjustable to determine the direction of the magnetic flux established by the coils.

In testimony whereof I subscribe my signature in presence of two witnesses.

THOMAS DUNCAN.

Witnesses:
 T. E. ZOLLARS,
 H. R. WOLFE.